(12) United States Patent
Hoskin

(10) Patent No.: US 9,631,776 B2
(45) Date of Patent: Apr. 25, 2017

(54) MODEL-BASED CONTROLS FOR SELECTIVE CATALYST REDUCTION SYSTEMS

(71) Applicant: General Electric Company, Schenectady, NY (US)

(72) Inventor: Robert Frank Hoskin, Deluth, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1117 days.

(21) Appl. No.: 13/670,578

(22) Filed: Nov. 7, 2012

(65) Prior Publication Data

US 2013/0098462 A1   Apr. 25, 2013

Related U.S. Application Data

(63) Continuation-in-part of application No. 12/702,557, filed on Feb. 9, 2010, now Pat. No. 8,584,444.

(51) Int. Cl.
*F17D 3/00* (2006.01)
*F01N 3/18* (2006.01)
*F01N 3/20* (2006.01)

(52) U.S. Cl.
CPC ............ *F17D 3/00* (2013.01); *F01N 3/18* (2013.01); *F01N 3/208* (2013.01); *F01N 2560/026* (2013.01); *F01N 2560/06* (2013.01); *F01N 2560/07* (2013.01); *F01N 2560/14* (2013.01); *F01N 2610/02* (2013.01);
(Continued)

(58) Field of Classification Search
CPC . F01N 3/2066; F01N 3/208; F01N 2900/1616
USPC ......... 60/272, 273, 274, 276, 277, 282, 286, 60/287, 294, 295, 301, 303
See application file for complete search history.

(56) References Cited

U.S. PATENT DOCUMENTS 6,620,393 B2   9/2003   Spokoyny
7,707,824 B2   5/2010   Solbrig
(Continued)

FOREIGN PATENT DOCUMENTS

WO   2006000877 A2   1/2006

*Primary Examiner* — Mark A Laurenzi
*Assistant Examiner* — Mickey France
(74) *Attorney, Agent, or Firm* — Cooper Legal Group, LLC

(57) ABSTRACT

Systems and methods are provided for controlling a selective catalyst reduction (SCR) system having a SCR reactor. A reductant slip set point indicative of a target slip is received as a control variable is to be utilized for maintaining an amount of a $NO_x$ composition included in a combustion gas below a selected limit. A signal transmitted by a sensor is received, and is indicative of the reductant slip downstream of the SCR reactor. An amount of a $NO_x$ reductant to be introduced to the SCR reactor is determined based, at least in part, on a relationship between the target reductant slip and the reductant slip downstream of the SCR reactor indicated by the signal. A control signal is transmitted to cause introduction of the amount of the $NO_x$ reductant to the SCR reactor to maintain the amount of the $NO_x$ composition in the combustion gas below the selected limit.

19 Claims, 15 Drawing Sheets

(52) U.S. Cl.
CPC ........... *F01N 2900/0412* (2013.01); *F01N 2900/0416* (2013.01); *F01N 2900/1614* (2013.01); *F01N 2900/1616* (2013.01); *F01N 2900/1622* (2013.01); *F01N 2900/18* (2013.01); *Y02T 10/24* (2013.01); *Y10T 137/0329* (2015.04)

(56) References Cited

U.S. PATENT DOCUMENTS

| | | |
|---|---|---|
| 2005/0282285 A1 | 12/2005 | Radhamohan et al. |
| 2008/0250778 A1 | 10/2008 | Solbrig |
| 2009/0133383 A1* | 5/2009 | Shost .................. F01N 3/2066 60/276 |
| 2009/0272101 A1 | 11/2009 | Wills et al. |
| 2009/0272105 A1* | 11/2009 | Chi .................. B01D 53/9409 60/295 |
| 2009/0301066 A1* | 12/2009 | Sindano ................ F01N 3/208 60/286 |
| 2010/0101215 A1* | 4/2010 | Wu ...................... F01N 3/208 60/286 |
| 2010/0107609 A1* | 5/2010 | Parmentier ............ B01D 53/90 60/286 |
| 2010/0242440 A1* | 9/2010 | Garimella .......... B01D 53/9409 60/276 |
| 2011/0150732 A1* | 6/2011 | Larsson ............ B01D 53/8631 423/239.1 |
| 2011/0258992 A1 | 10/2011 | Gonze et al. |

\* cited by examiner

MODEL-BASED CONTROLS FOR SELECTIVE CATALYST REDUCTION SYSTEMS

CROSS-REFERENCE TO RELATED APPLICATIONS

This application is a continuation-in-part of U.S. application Ser. No. 12/702,557, filed Feb. 9, 2010, which is incorporated in its entirety herein by reference.

BACKGROUND OF THE INVENTION

Field of the Invention

The present invention relates to methods and systems for controlling reductant slip, and in particular, for controlling ammonia slip downstream of a selective catalyst reduction (SCR) system.

Description of Related Art

Powerplant and engine exhaust systems can include an SCR reactor for removing nitrogen oxides ($NO_x$) from exhaust gases. A reductant, such as ammonia, is injected into the exhaust gas stream entering the SCR reactor to remove $NO_x$ from the exhaust gas. An operating attribute associated with SCR reactors is "ammonia slip," i.e., unreacted ammonia passing through the SCR reactor and exiting the exhaust system with the exhaust gas. It would be desirable to accurately control parameters of the exhaust system, such as the amount of ammonia injected into the exhaust stream, to minimize ammonia slip.

BRIEF SUMMARY OF THE INVENTION

The following presents a simplified summary of the invention in order to provide a basic understanding of some illustrative aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, provided is a method of controlling a selective catalyst reduction (SCR) system having a SCR reactor. The method includes receiving a reductant slip set point input as a control variable for maintaining an amount of a $NO_x$ composition included in an exhaust gas below a selected limit. The reductant slip set point is indicative of a target reductant slip that is desired downstream of the SCR reactor. A signal transmitted by a sensor is received, and is indicative of a reductant slip downstream of the SCR reactor. An amount of a $NO_x$ reductant to be introduced to the SCR reactor is determined based at least in part on a relationship between the target reductant slip and the reductant slip downstream of the SCR reactor indicated by the signal. A control signal is transmitted to cause introduction of the amount of the $NO_x$ reductant to the SCR reactor to maintain the amount of ensure that the $NO_x$ composition in the exhaust gas is reduced below the desired value.

In accordance with another aspect of the present invention, provided is a method of regulating emission of a $NO_x$ composition with a selective catalyst reduction (SCR) system including a SCR reactor. The method includes, with the SCR reactor, receiving a flue gas emitted by a combustion source. A $NO_x$ reductant is introduced to the flue gas upstream of a catalyst provided within the SCR reactor. A target reductant slip suitable to maintain emission of the $NO_x$ composition in an exhaust gas exiting the SCR reactor below a desired limit is established. The target reductant slip corresponds to a desired amount of the $NO_x$ reductant introduced to the SCR reactor that is to exit the SCR reactor with the exhaust gas. A reductant slip of the SCR reactor is monitored using a parameter indicative of the amount of the $NO_x$ reductant exiting the SCR reactor. The $NO_x$ composition in the exhaust gas is maintained below the desired limit based at least in part on a result of said monitoring the reductant slip by controlling introduction of the $NO_x$ reductant introduced to the SCR reactor to cause the reductant slip of the SCR reactor to approach the target reductant slip.

In accordance with another aspect of the present invention, provided is a method of controlling a selective catalyst reduction (SCR) system having a SCR reactor. The method includes receiving a reductant slip set point indicative of a target reductant slip, and receiving a desired limit indicating a maximum amount of a $NO_x$ composition deemed to be allowable in an exhaust gas exiting the SCR reactor. Information indicative of the reductant slip and an amount of the $NO_x$ composition in the exhaust gas downstream of the SCR reactor is received. An operational parameter of the SCR reactor is monitored to determine whether the SCR reactor is operating under steady state conditions or under transition conditions. In response to a determination that the SCR reactor is operating under steady state conditions, introduction of a reductant into the SCR reactor is controlled based at least in part on a relationship between the $NO_x$ composition in the exhaust gas and the maximum amount of the $NO_x$ composition; e.g., SCR controls operating in "NOx setpoint mode". And, in response to a determination that the SCR reactor is operating under transition conditions, introduction of the reductant into the SCR reactor can optionally be controlled based at least in part on a relationship between the reductant slip downstream of the SCR reactor and the target reductant slip; e.g., SCR controls operating in "reductant-slip setpoint mode".

In accordance with another aspect of the present invention, provided is a selective catalyst reduction (SCR) system. The system includes a SCR reactor including an inlet through which a flue gas emitted by a combustion source is introduced to the SCR reactor and an outlet through which an exhaust gas exits the SCR reactor. A catalyst is provided to the SCR reactor, and an injector is configured to introduce a reductant into the SCR reactor. A sensor senses a quantity indicative of the reductant slip downstream of the SCR reactor and transmits a signal representing the reductant slip. Optionally, a quantity indicative of the reductant slip can be calculated using sensed values of NOx compositions at the inlet and exit of the SCR reactor in combination with a sensed value of the injector flow, e.g., a "calculated reductant slip". A controller regulates introduction of the reductant into the SCR reactor through the injector and controls emission of a $NO_x$ composition in the exhaust gas based at least in part on a target reductant slip. The control system includes a receiving component that receives a reductant slip set point indicative of the target reductant slip, and a sensing component that receives the signal transmitted by the sensor. A calculation component provided to the control system establishes an amount of the reductant to be introduced into the SCR reactor based at least in part on the reductant slip downstream of the SCR reactor relative to the target reductant slip. Optionally, the calculation component includes a calculated reductant slip. A transmission component provided to the control system transmits a control signal for controlling operation of the injector to regulate an amount of the reductant being introduced to the SCR reactor to cause the reductant slip of the SCR reactor to approach the target reductant slip.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 14A shows an expanded view of the ammonia slip within the dashed box in

FIG. 13;

DETAILED DESCRIPTION OF THE INVENTION

Figure 1:
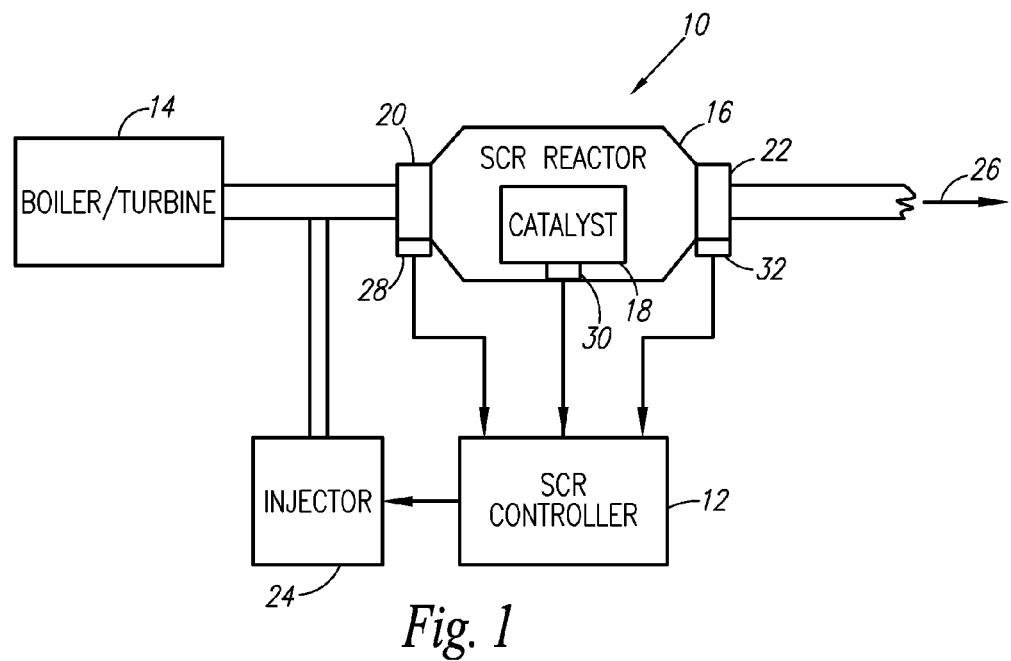
FIG. 1 is a schematic diagram of an illustrative embodiment of a SCR system that includes at least one aspect in accordance with the present invention.

Features and aspects of the present invention will now be described more fully hereinafter with reference to the accompanying drawings in which illustrative embodiments are shown. Whenever possible, the same reference numerals are used throughout the drawings to refer to the same or like parts. However, this invention may be embodied in many different forms and should not be construed as limited to the embodiments set forth herein. These illustrative embodiments are provided so that this disclosure will be both thorough and complete, and will fully convey the scope of the invention to those skilled in the art.

Control methodologies are included in the following description. The control methodologies may reference specific portions, components, inputs or outputs of a controlled system, for purposes of explaining the control methodologies. It may be evident, however, that the control methodologies can be effectively applied to other portions, components, inputs or outputs of the controlled system. The invention is therefore not limited to particular details of this disclosure except to the extent that the claims are necessarily so limited.

Various signals are discussed below. It is to be appreciated that the signals can be analog signals, digital signals or data values stored in a memory location, such as a register. Various circuits and portions of circuits are discussed below. It is to be appreciated that the circuits and portions of circuits, including the components described below and recited in one or more of the claims, can be implemented via discrete electrical components, integrated circuits, and/or through the execution of program instructions stored in a non-transitory computer-readable medium accessible to a SCR controller 12 by a computer processor, for example.

FIG. 1 is a schematic diagram of an illustrative SCR system 10. The SCR system 10 receives a flue gas having various nitrogen oxide compositions such as nitric oxide (NO) and nitrogen dioxide ($NO_2$) (collectively referred to herein as a "$NO_x$ composition"), emitted in combustion gases from a source such as a boiler/turbine 14 in a powerplant, for example. The SCR system 10 can be used for utility boilers, industrial boilers, and municipal solid waste boilers with steam turbines. It is to be appreciated that the application of the SCR system 10 is not limited to the boiler with the steam turbine, and can be used for internal combustion engines that produce $NO_x$ in their exhaust gases, such as gas turbines, engines of large ships, diesel locomotives, and automobiles. The SCR system 10 can also be used for a steam and gas turbine combined cycle system known under the General Electric Co. trademark STAG. Although the SCR reactor system 10 can receive a flue gas from any combustion source, the following description refers to a SCR system 10 for a boiler/turbine 14 of a powerplant and controls for such a SCR system 10 for ease of explaining illustrative embodiments, but it is to be understood that other systems may be similarly controlled. For the sake of brevity, an ammonia-containing composition is described as the $NO_x$ reductant or, more specifically, as ammonia or an ammonia-containing composition in the illustrative embodiments below. The reductant slip is also described as ammonia slip in the illustrative embodiments below. However, it is to be understood that any suitable $NO_x$ reductant, in addition to ammonia, that reacts with the $NO_x$ composition as described herein to convert at least a portion of the $NO_x$ composition into diatomic nitrogen ($N_2$) and water ($H_2O$) is within the scope of the present invention.

The SCR system 10 can include a SCR reactor 16 having a catalyst 18, an inlet 20 through which the flue gas emitted by the combustion source is introduced to the SCR reactor 16, and an outlet 22 through which an exhaust gas exits the SCR reactor 16. The SCR system 10 can further include an injector 24 located upstream from the inlet 20 of the SCR reactor 16 to inject a $NO_x$ reductant into the SCR reactor 16 such that the reductant is adsorbed on the surface of the catalyst 18. The flue gases of the powerplant including the $NO_x$ composition from the boiler/turbine 14 flow into the SCR reactor 16 through the inlet 20, react with the reductant adsorbed on the surface of the catalyst 18, and are converted into nitrogen and water by the aid of the catalyst 18.

The terms "upstream" and "downstream" are used herein to describe the location of events and structures such as the injector 24 along the flow of the flue gas and exhaust gas. For instance, the injector 24 is said to be disposed upstream from the inlet 20 of the SCR reactor 16. As such, the flue gas being transported to the SCR reactor 16 will encounter the injector 24 before the SCR reactor 16. Likewise, exhaust gas downstream of the SCR reactor 16 will have already exited the SCR reactor 16.

Catalyst 18 can be manufactured from carrier and active catalytic components. The carrier can include various ceramic materials, such as titanium oxide. The active catalytic components can include oxides of base metals, vanadium and tungsten, for example. The active catalytic components can also include zeolites, such as iron- and copper-exchanged zeolites. The active catalytic components can further include various precious metals, such as gold, silver, and platinum.

The $NO_x$ reduction reaction takes place as the gases (e.g., the flue gas from the combustion source and the $NO_x$ reductant) pass through the SCR reactor 16. Before entering the SCR reactor 16, the $NO_x$ reductant is injected by the injector 24 and mixed with the flue gases from the boiler/turbine 14. The $NO_x$ reductant can include anhydrous ammonia, aqueous ammonia or urea. The $NO_x$ reductant can also include cyanuric acid and ammonium sulfate. Nevertheless, the unreacted $NO_x$ reductant (i.e., any reductant introduced to the SCR reactor 16 that exits the SCR reactor 16 in the exhaust gas without reacting with the $NO_x$ composition) is released through the outlet 22 of the SCR reactor 16 as ammonia slip 26.

The ideal reaction in the SCR reactor 16 has an optimal temperature range from about 225° C. to about 445° C., and in one specific example, from about 355° C. to about 445° C. Using ammonia as an example of the $NO_x$ reductant, ammonia slip 26 occurs when temperatures of the SCR reactor 16 are not in the optimal range for the reaction or when too much reductant is injected into the SCR reactor 16. Particularly, during the startup or shutdown of the powerplant, the temperature of the SCR reactor 16 may drop below 225° C., for example, to a temperature of about 100° C. and thus, cause the ammonia slip 26 to be released from the outlet 22 of the SCR reactor 16, which is undesirable for the SCR system 10.

As shown in FIG. 1, the SCR system 10 can include a SCR controller 12. The SCR controller 12 can be operatively coupled to the injector 24 and the SCR reactor 16 to control the operation of the SCR system 10, and in particular, to control the ammonia slip 26 during transition periods of the SCR system 10 operation, such as during the startup and shutdown of the powerplant, for example. The startup and shutdown periods, along with any other period of rapid change in at least one operational parameter of the SCR reactor 16, the powerplant, both, or a portion thereof such as an electrical generator, are referred to herein generally as "transition periods". Likewise, operation of the SCR reactor 16 during such transition periods is referred to herein as "operating under transition conditions". According to an illustrative embodiment, the transition period can be any period of time during which an operational parameter of the SCR reactor 16 changes by at least five (5%/min.) percent per minute. Other illustrative embodiments require the operational parameters of the SCR reactor 16 to change by at least 10 (10%/min.) percent per minute to establish a transition period. A transition period can include power plant operation wherein the power plant output to an electric grid changes by more than 5%/min, where 100% corresponds to power plant maximum output. Periods when the operational parameters of the SCR reactor 16 are not changing by at least 5%/min., or at least 10%/min., depending on the embodiment, are referred to herein as steady state periods, when the SCR reactor 16 is said to be operating in under steady state conditions. Examples of the operational parameters can include a mass flow rate of the exhaust gas, the output power of a load (e.g., electric generator) being driven by the combustion source, temperature of the exhaust gas entering the SCR reactor and any other parameter indicative of a rapid change in the quantity or attributes of the flue gas to be received by the SCR reactor 16 and subjected to selective catalytic reduction.

By regulating the injection of the reductant into the SCR reactor 16 from the injector 24, the SCR controller 12 can control the ammonia slip 26 from the SCR reactor 16. Regulating the introduction (i.e., controlling the amount, rate of injection, etc. . . . ) of the ammonia into the SCR reactor 16 based on a sensed (or calculated) value of the ammonia slip compared to a desired, target reductant slip value (referred to herein as "target ammonia slip", but includes any suitable reductant, and is not limited solely to ammonia) established as a slip set point during a transition period, also maintains emission of the $NO_x$ composition from the SCR reactor 16 in the exhaust gas below a desired limit that is selected. Thus, the $NO_x$ composition emission is maintained below a selected, desired limit of $NO_x$ composition (hereinafter referred to as a "$NO_x$ limit") that is deemed to be permissible in the exhaust gas based on the target ammonia slip during proper operation of the SCR reactor 16. Introduction of ammonia or other $NO_x$ reductant into the SCR reactor 16 can optionally be regulated based on the amount of the $NO_x$ composition sensed in the exhaust gas downstream of the SCR reactor 16 relative to the $NO_x$ limit during steady-state periods, wherein such regulation is already known in the art (NOx setpoint control).

The SCR controller 12 can implement various control schemes to regulate the injector 24. Such control schemes can include open-loop control schemes and closed-loop control schemes that incorporate feedforward, proportional and integral control features. Therefore, in one embodiment in accordance with the invention, the SCR controller 12 implements an open-loop control scheme to regulate the injector 24 by the amount of ammonia adsorbed on the surface of the catalyst 18 (theta). In accordance with another embodiment, the SCR controller 12 implements a control scheme to regulate the injector 24 by the target ammonia slip established for the SCR controller 12. It has been found that regulating operation of the injector 24 to urge the ammonia slip to approach the target ammonia slip not only maintains the ammonia slip below acceptable levels, but also maintains the emitted $NO_x$ composition below the $NO_x$ limit. According to one example embodiment, the SCR controller 12 implements an adaptive control scheme to regulate the injector 24 based on the amount of ammonia adsorbed on the surface of the catalyst 18 (theta) in combination with feed-forward, proportional and integral controls. Embodiments of the invention have been found to be superior over prior-art SCR controls during transition operating conditions.

The SCR controller 12 can be an electronic controller and may include a computer processor. The SCR controller 12 can include one or more of a microprocessor, a microcontroller, a digital signal processor (DSP), an application specific integrated circuit (ASIC), a field-programmable gate array (FPGA), discrete logic circuitry, or the like. The SCR controller 12 can further include a non-transitory computer-readable memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EE-PROM), flash memory, or the like. The SCR controller 12 can further include one or more analog-to-digital (A/D) converters for processing various analog inputs to the controller.

The SCR controller 12 can monitor one or more inputs from one or more sensors operatively connected to communicate with the SCR controller 12 located along the SCR system 10. An inlet sensor 28 can be operatively coupled at the inlet 20 of the SCR reactor 16 and obtain the information including the temperature (T), mass flow rate (M), concentration of $NO_x$ ($C_{NOx}$) in the incoming flue gases, and the concentration of ammonia ($C_{NH3}$) upstream from or immediately at the inlet 20 of the SCR reactor 16. Optionally, and alternatively, a catalyst sensor 30 can be operatively coupled to the catalyst 18 in the SCR reactor 16 and obtain the information of the catalyst 18 including the temperature (T), mass flow rate (M), concentration of $NO_x$ ($C_{NOx}$) of the incoming flue gases, and the concentration of injected ammonia ($C_{NH3}$) near or at the catalyst 18 in the SCR reactor 16. An outlet sensor 32 can also be operatively coupled at the outlet 22 of the SCR reactor 16 and obtain the information such as the amount of ammonia slip 26 (SLIP Sensing of temperature (T), mass flow rate (M), concentration of $NO_x$ ($C_{NOx}$) and ammonia ($C_{NH3}$) in the incoming gases, and amount of ammonia slip 26 (SLIP) can be accomplished using instrumentation known in the art for powerplant controls. Optionally, ammonia slip can be calculated using sensed values of NOx compositions at the inlet and exit of the SCR reactor in combination with a sensed value of the injector flow. The SCR controller 12 can be configured to monitor the conditions at multiple locations along the SCR system 10 via outputs from the inlet sensor 28, catalyst sensor 30, and outlet sensor 32.

Figure 8:
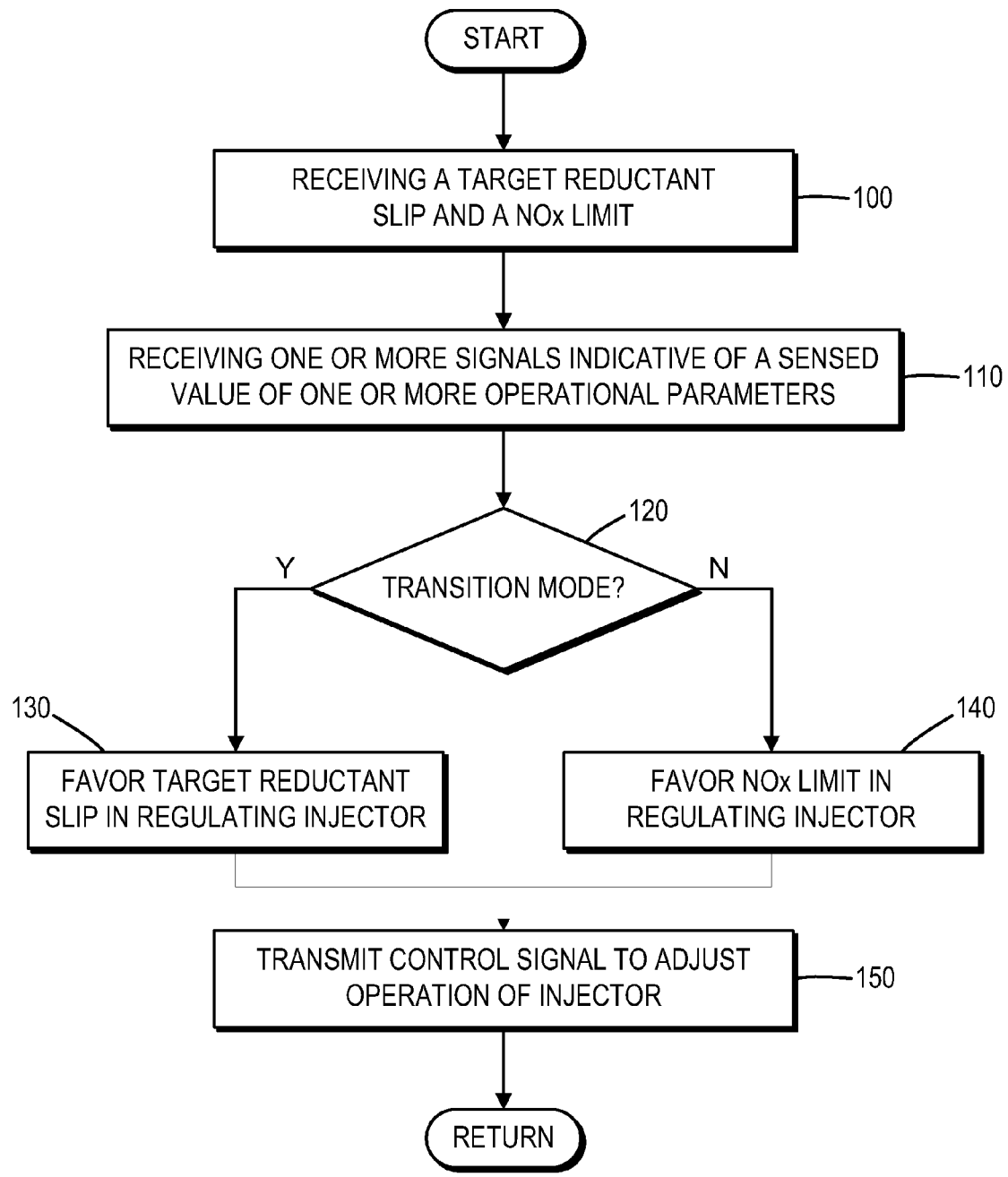
FIG. 8 is a flow chart illustrating an embodiment of a control method for controlling ammonia slip downstream of a SCR system in accordance with at least one aspect of the present invention.

The illustrative embodiment of the SCR controller 12 shown in FIGS. 2-6 implements an adaptive control method, schematically depicted in the flow diagram of FIG. 8. Generally, the adaptive control method involves determining whether the SCR reactor 16 (FIG. 1) is operating in under steady-state conditions or under transition conditions, and adapting the control mode accordingly. With the SCR reactor 16 operating under steady-state conditions, the SCR controller 12 performs a $NO_x$ limit control routine to determine an adjustment of the injector 24 based on the $NO_x$ limit input to the SCR controller 12 as a set point. This $NO_x$ limit can optionally be the primary control parameter considered during the steady-state period while the SCR reactor is operating under steady-state conditions, or can at least be afforded a higher priority (i.e., weighted more heavily) in regulating the introduction of the ammonia to the SCR reactor 16 than the target ammonia slip during the steady-state period. According to an illustrative embodiment, the $NO_x$ limit can be considered to the exclusion of the target ammonia slip. In other words, the control signal for controlling operation of the injector can be generated independently of, and without consideration of, the target ammonia slip. For such an embodiment, the resulting control signal is said to be independent of the target ammonia slip, and transmitted independently of the target ammonia slip.

Likewise, a target slip control routine can be performed by the SCR controller 12 to maintain the amount of the $NO_x$ composition emitted and the ammonia slip at acceptable levels while the SCR reactor 16 is operating under transition conditions. Under such a control routine the target ammonia slip can optionally be the primary control parameter during a transition period, or can at least be afforded a higher priority (i.e., weighted more heavily) in regulating the introduction of the ammonia to the SCR reactor 16 than the $NO_x$ limit during the transition period. During the transition period, the $NO_x$ limit can also optionally be considered as a secondary control parameter, establishing a maximum amount of the $NO_x$ composition that can be sensed downstream of the SCR reactor 16 before the target slip control routine is to be terminated. Thus, so long as the amount of the $NO_x$ composition downstream from the SCR reactor 16 during the transition period remains below the $NO_x$ limit, the SCR controller 12 regulates introduction of the ammonia via the injector 24 during the transition period based, to a greater extent, on the target ammonia slip than the $NO_x$ limit.

If, during the transition period, the amount of the $NO_x$ composition downstream of the SCR reactor 16 exceeds the $NO_x$ limit, the SCR controller 12 can resort to controlling the injection of ammonia via the injector 24 as if the SCR reactor 16 were operating under steady-state conditions. Controlling the injector 24 under such a circumstance includes receiving, with the SCR controller 12, a $NO_x$ signal from a sensor indicative of the amount of the $NO_x$ composition included in the exhaust gas exiting the SCR reactor 16. If the SCR controller 12 determines that the amount of the $NO_x$ composition included in the exhaust gas is less than the $NO_x$ limit. While the amount of the $NO_x$ composition in the exhaust gas is less than the $NO_x$ limit, the control signal transmitted causes introduction of an appropriate amount of ammonia via the injector 24 based primarily on a difference between the target ammonia slip and the ammonia slip sensed downstream of the SCR reactor 16.

With specific reference to FIG. 8, the adaptive control method involves receiving the target ammonia slip and the $NO_x$ limit as control parameters at step 100. These control parameters can be received as fixed values during construction of the SCR controller 12 (FIG. 1), or can be user adjustable to be varied to accommodate the changing needs of an existing installation.

At step 110 (FIG. 8), a signal indicative of one or more of the operational parameters is received by the SCR controller 12 (FIG. 1). As discussed in detail above, the signal can be transmitted by a suitable sensor to indicate a value of any operational parameter that can be used to determine the operational state of the SCR reactor 16. Based at least in part on this signal, the SCR controller 12 can determine whether the SCR reactor 16 is operating under transition conditions (TRANSITION PERIOD) at step 120 in FIG. 8. If the SCR controller 12 (FIG. 1) determines the SCR reactor 16 is operating under transition conditions, the SCR controller 12 performs a target slip control routine at step 130 (FIG. 8) to regulate introduction of ammonia into the SCR reactor 16 (FIG. 1) based on the target ammonia slip received as a control parameter. The target slip control routine involves favoring, or at least affording greater weight to the target ammonia slip value than the $NO_x$ limit in determining the amount of ammonia to inject via the injector 24. Controlling introduction of the ammonia under the target slip control routine involves evaluating a difference between the ammonia slip 26 sensed downstream of the SCR reactor 16 and the target ammonia slip. If an excess slip condition exists, where the ammonia slip 26 sensed downstream of the SCR reactor 16 exceeds the target ammonia slip, a control signal representing a reduction signal is generated. When transmitted, the reduction signal results in a reduction in the amount of the ammonia introduced to the SCR reactor 16 from a first amount being introduced when the excess slip condition was determined to exist, to a second, lesser amount.

Likewise, if a low slip condition exists, where the ammonia slip 26 downstream of the SCR reactor 16 is less than the target ammonia slip, a control signal is generated to cause an increase in the amount of the ammonia being introduced to the SCR reactor 16 from the amount resulting in the low slip condition to a greater amount. The extent of the increase and the amount of ammonia introduced can optionally be determined independently of (i.e., without consideration of) an amount of a $NO_x$ composition sensed in the exhaust gas as part of the control routine, so long as the amount of the $NO_x$ composition sensed in the exhaust gas is less than the $NO_x$ limit. Thus, the SCR controller 12 is operable to control introduction of ammonia via the injector 24 to cause the ammonia slip sensed downstream of the SCR reactor 16 to approach the target ammonia slip.

If the amount of the $NO_x$ composition sensed in the exhaust gas exceeds the $NO_x$ limit during a transition period, the SCR controller 12 can resort to controlling injection of the ammonia based on the $NO_x$ limit as the set point. Under such a routine, the amount of ammonia introduced to the SCR reactor 16 is increased to initiate a decline in the amount of the $NO_x$ composition sensed in the exhaust gas.

If, at step 120 (FIG. 8), it is determined that the SCR reactor 16 (FIG. 1) is not operating in a transition period, then the SCR controller 12 (FIG. 1) determines that the SCR reactor 16 is operating in a steady-state period and can initiate a $NO_x$ limit control routine at step 140 (FIG. 8). Under the $NO_x$ limit control routine, the $NO_x$ limit is favored, or at least afforded a greater weight to the target ammonia slip value compared to the target ammonia slip in determining the amount of ammonia to inject via the injector 24.

The control signal generated by the SCR controller 12 (FIG. 1) is transmitted at step 150 (FIG. 8) to adjust the injector 24 (FIG. 1) and thereby control the amount of ammonia introduced to the SCR reactor 16 (FIG. 1) as described above. The amount of ammonia introduced to the SCR reactor 16 via the injector 24 under either control routine maintains the amount of the $NO_x$ composition below the $NO_x$ limit or other amount of the $NO_x$ composition deemed to be acceptable. Further, ammonia slip can be regulated at a value that is approximately equal to the target ammonia slip, and maintains the amount of the $NO_x$ composition downstream of the SCR reactor 16 below the $NO_x$ limit.

Although the embodiments described above vary the control routine between a plurality of different control routines based on the operational mode of the SCR reactor 16, other embodiments can optionally utilize either the target slip control routine or the $NO_x$ limit control routine at all times, regardless of the operational mode of the SCR reactor 16.

Figure 2:
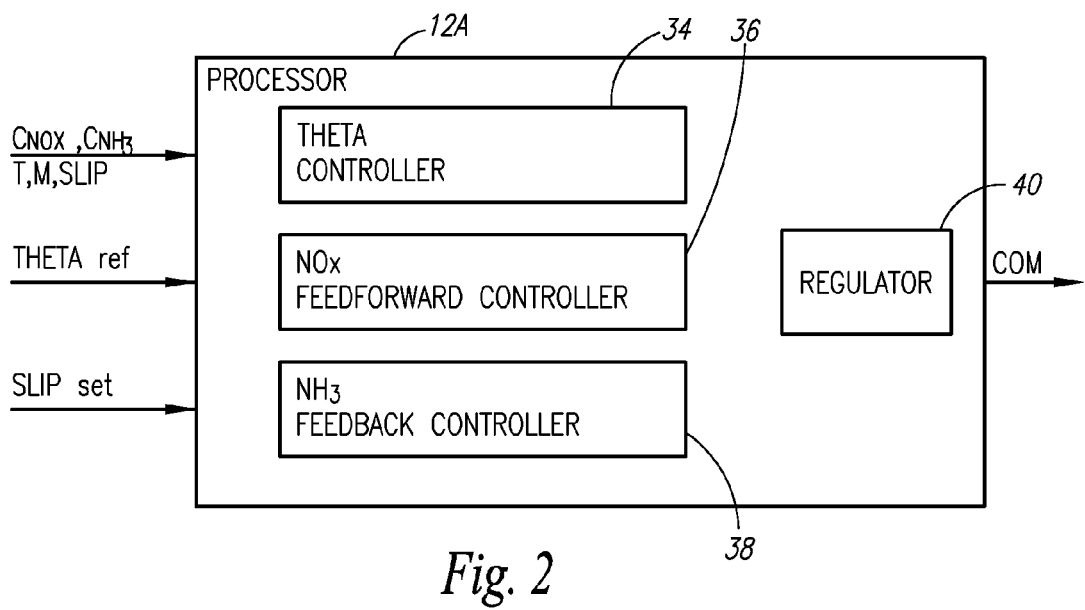
FIG. 2 is a schematic diagram of a processor of a SCR controller of the SCR system of FIG. 1.

Turning to FIGS. 2-6, specifics of another illustrative embodiment of the SCR controller 12 are provided. The SCR controller 12 according to such an illustrative embodiment regulates the introduction of ammonia via the injector 24 taking into consideration a plurality of control parameters, including the target ammonia slip. The SCR controller 12 determines the conditions of the SCR reactor 16 (e.g. T, M, $C_{NOx}$, $C_{NH3}$, SLIP) and predetermined (e.g., selected) and/or desired parameters such a reference value of theta ($theta_{ref}$) and the target ammonia slip established as a set-point ($SLIP_{set}$) of the SCR controller 12, and regulates the operation of the injector 24 based on such conditions. In FIG. 2, $theta_{ref}$ and $SLIP_{set}$ are schematically shown as inputs to the SCR controller 12. However, it is to be appreciated that $theta_{ref}$ and $SLIP_{set}$ can be generated directly by the SCR controller 12. As shown in FIG. 2, the SCR controller 12 may include a processor 12A for performing various calculations and providing the functionality ascribed herein to the SCR controller 12. The processor 12A can output a command signal (COM) for regulating the operation of the injector 24. The processor 12A can include a theta controller 34, a $NO_x$ feedforward controller 36, a $NH_3$ feedback controller 38, and a regulator 40. The $NO_x$ feedforward controller 36 and $NH_3$ feedback controller 38 are optional as the theta controller 34 alone can be operatively coupled to the regulator 40 and adjust the command signal (COM). It is also appreciated that the $NO_x$ feedforward controller 36 and $NH_3$ feedback controller 38, alone or in combination, can be coupled to the theta controller 34 and the regulator 40 to generate the command signal (COM).

Figure 3:
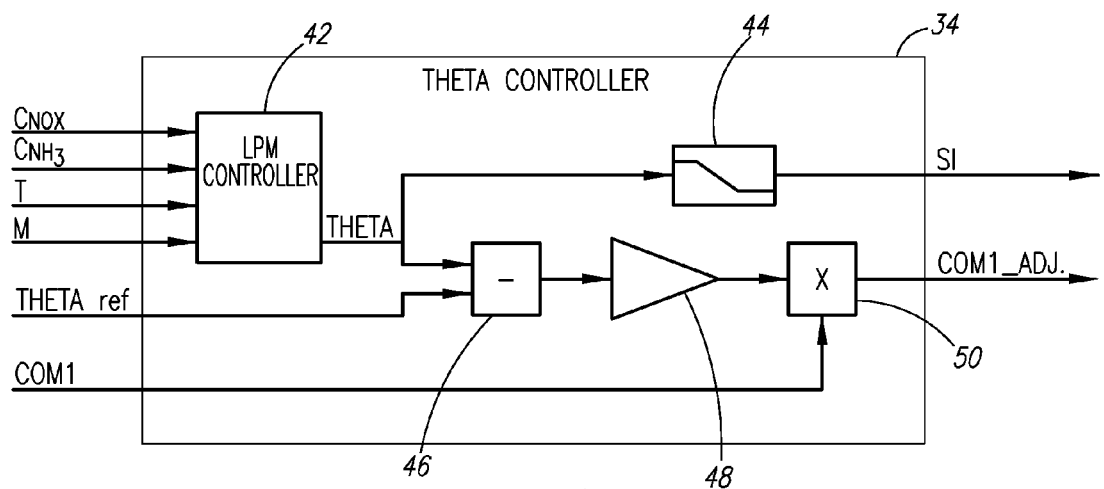
FIG. 3 is a schematic diagram of a theta controller of the SCR controller of the SCR system.

Referring to FIG. 3, a specific illustrative embodiment of the theta controller 34 of the SCR controller 12 is shown in detail. A lumped-parameter kinetic model (LPM) controller 42 is used to calculate theta at different locations along or through the SCR reactor 16 using a LPM model. Alternatively, any other kinetic model that provides a representation of $NO_x$ and ammonia concentrations throughout the SCR reactor 16 from the inlet 20 to outlet 22, including a spatial representation of adsorbed ammonia (theta), can be applied to the theta controller 34. In the embodiment shown in FIG. 3, the LPM controller 42 can calculate the local value of theta at five axial locations along the SCR reactor 16. Lump 1 is the lumped parameter representation from a location nearest the inlet 20 of the SCR reactor 16 representing the location of about 3% of the total reactor axial length from the inlet 20. Lumps 2 through 5 are for locations within the SCR reactor 16 extending from the location associated with lump 1 to the outlet 22. It is to be appreciated that the specific locations associated with the lumps may be varied in accordance with specific construction/configuration of the SCR reactor 16. The conditions of the SCR reactor 16 monitored and outputted by the inlet sensor 28 and catalyst sensor 30 can be provided to the LPM controller 42 as the inputs of the LPM model. In particular, the conditions from the inlet sensor 28 (T, M, $C_{NOx}$, $C_{NH3}$) can be used for calculating theta for lump 1, which provides the desired output value for LPM controller 42. Theta for lump 1 is then sent to a lookup table 44 for generating a saturation indication signal (SI) that indicates whether the catalyst 18 surface is saturated with the adsorbed ammonia. The saturation indication signal (SI) is an output of the theta controller 34, and the value of SI can be in a range between 0 and 1.

Theta for lump 1 is also sent to a subtractor 46 together with another input signal (theta$_{ref}$) which is a predetermined reference value of the ammonia adsorbed on the catalyst 18 surface. An open-loop control scheme is used in the theta controller 34 to adjust the error between theta and theta$_{ref}$ at an amplifier 48. The gain of the amplifier 48 is determined using standard control system design techniques known to those practicing in the art. The output of the amplifier 48 is then sent to a multiplier 50 to adjust a first command signal (COM1) sent from the NO$_x$ feedforward controller 36. The adjusted first command signal (CMO1_ADJ) is another output of the theta controller 34.

Figure 4:
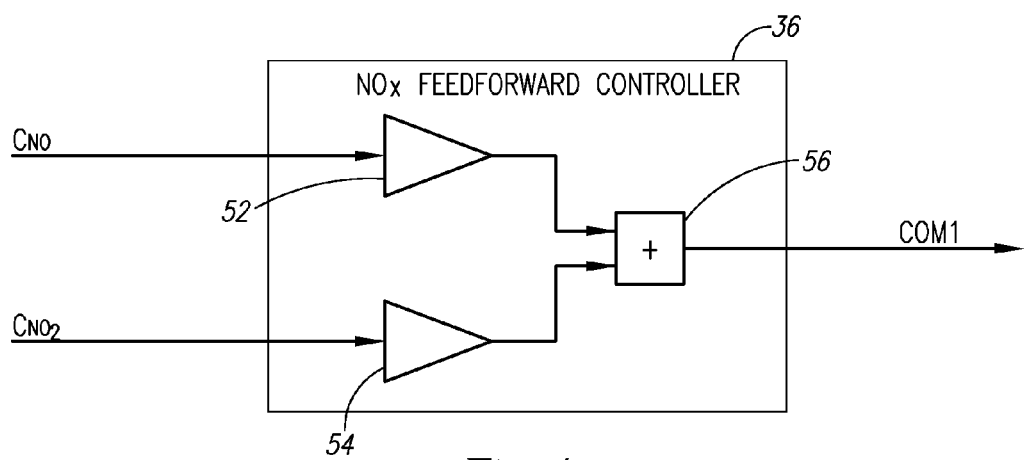
FIG. 4 is a schematic diagram of a $NO_x$ feedforward controller of the SCR controller of the SCR system.

Turning to FIG. 4, a specific illustrative embodiment of the NO$_x$ feedforward controller 36 of the SCR controller 12 is shown in detail. The NO$_x$ feedforward controller 36 generates a first command signal using a feedforward control scheme based on the concentrations of the NO$_x$ ($C_{NOx}$) monitored at the inlet 20 of the SCR reactor 16. As shown in FIG. 4, the concentration of nitric oxide ($C_{NO}$) and nitrogen dioxides ($C_{NO2}$) can be individually measured by the inlet sensor 28 and input to the NO$_x$ feedforward controller 36. In such a manner, a first amplifier 52 and a second amplifier 54 are used individually to control the gain of the two input signals ($C_{NOx}$, $C_{NO2}$); an adder 56 is then used to couple to results from the individual amplifiers 52, 54 to generate the first command signal (COM1). The gains of the individual amplifiers 52, 54 are determined using standard control system design techniques known to those practicing in the art. In another example, the concentration of the NO$_x$ ($C_{NOx}$) can be directly measured as a single signal and a signal amplifier can be used to generate the corresponding output first command signal. As mentioned above, in an illustrative embodiment of the invention, the first command signal (COM1) outputted from the NO$_x$ feedforward controller 36 can be sent to the theta controller 34 and multiplied by the output of the amplifier 48 to generate the adjusted first command signal (COM1_ADJ).

Figure 5:
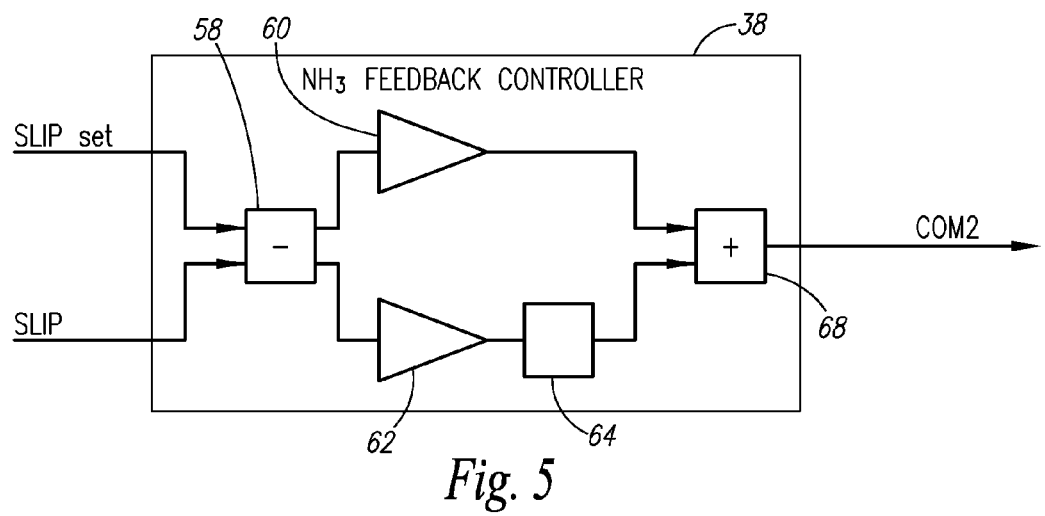
FIG. 5 is a schematic diagram of a $NH_3$ feedback controller of the SCR controller of the SCR system.

Referring to FIG. 5, a specific illustrative embodiment of the NH$_3$ feedback controller 38 of the SCR controller 12 is shown in detail. A subtractor 58 is first used to calculate an error or deviation between of the actual ammonia slip 26 (SLIP) from a selected, desired ammonia slip set-point (SLIP$_{set}$). The proportional response of the error value is adjusted by a proportional gain at amplifier 60, while the integral response is adjusted by an integral gain at amplifier 62 and integrated at the integrator 64. The adjusted proportional and integral responses are summed by an adder 68 to calculate the output of the NH$_3$ feedback controller 38. The output of NH$_3$ feedback controller 38 is defined as the second command signal (COM2). Other feedback control schemes such as proportional-integral-derivative (PID) control can also be applied to generate the second command signal (COM2) according to the error or deviation between of the actual ammonia slip 26 (SLIP) from the selected, desired ammonia slip set-point (SLIP$_{set}$).

Figure 6:
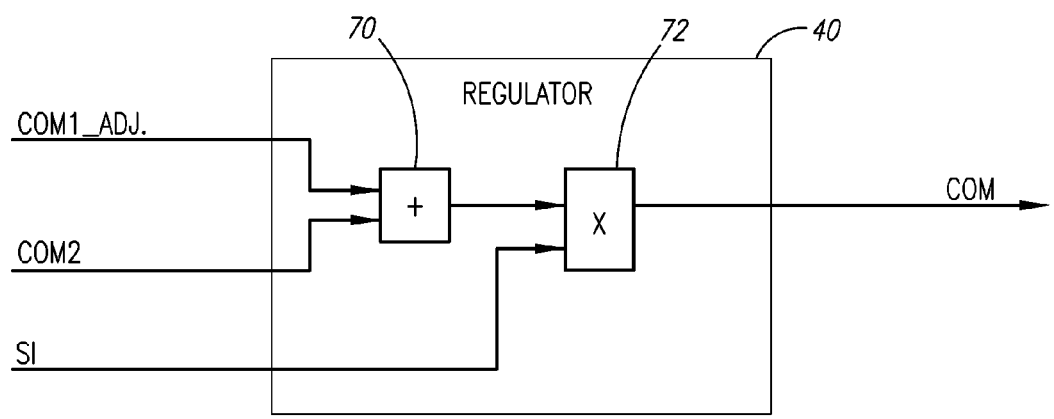
FIG. 6 is a schematic diagram of a regulator of the SCR controller of the SCR system.

Referring to FIG. 6, a specific illustrative embodiment of the regulator 40 of the SCR controller 12 is shown in detail. The adjusted first command signal (COM1_ADJ) from the theta controller 34 is summed with the second command signal (COM2) from the NH$_3$ feedback controller 38 by an adder 70. The output of the adder 70 is then adjusted by multiplying the saturation indication (SI) at a multiplier 72. As mentioned above, the value of the saturation indication (SI) is between 0 and 1; therefore, the adjusted command signal (COM) output from the multiplier 72 becomes 0 if the saturation indication is 0. In this case, the SCR controller 12 outputs the command signal (COM) to temporarily turn off the injector 24 until the saturation indication (SI) goes above 0. In such a manner, ammonia slip 26 (SLIP) is regulated by the SCR controller 12 to avoid undesired ammonia slip exceeding the set-point. In another example, the first command signal (COM1) can be directly sent from the NO$_x$ feedforward controller 36 to the adder 70 without first being adjusted by the theta controller 34. In still another example, either the first command signal (COM1) or the second command signal (COM2) alone can be directly adjusted by the saturation indication (SI) without first being summed with the other.

Figure 7:
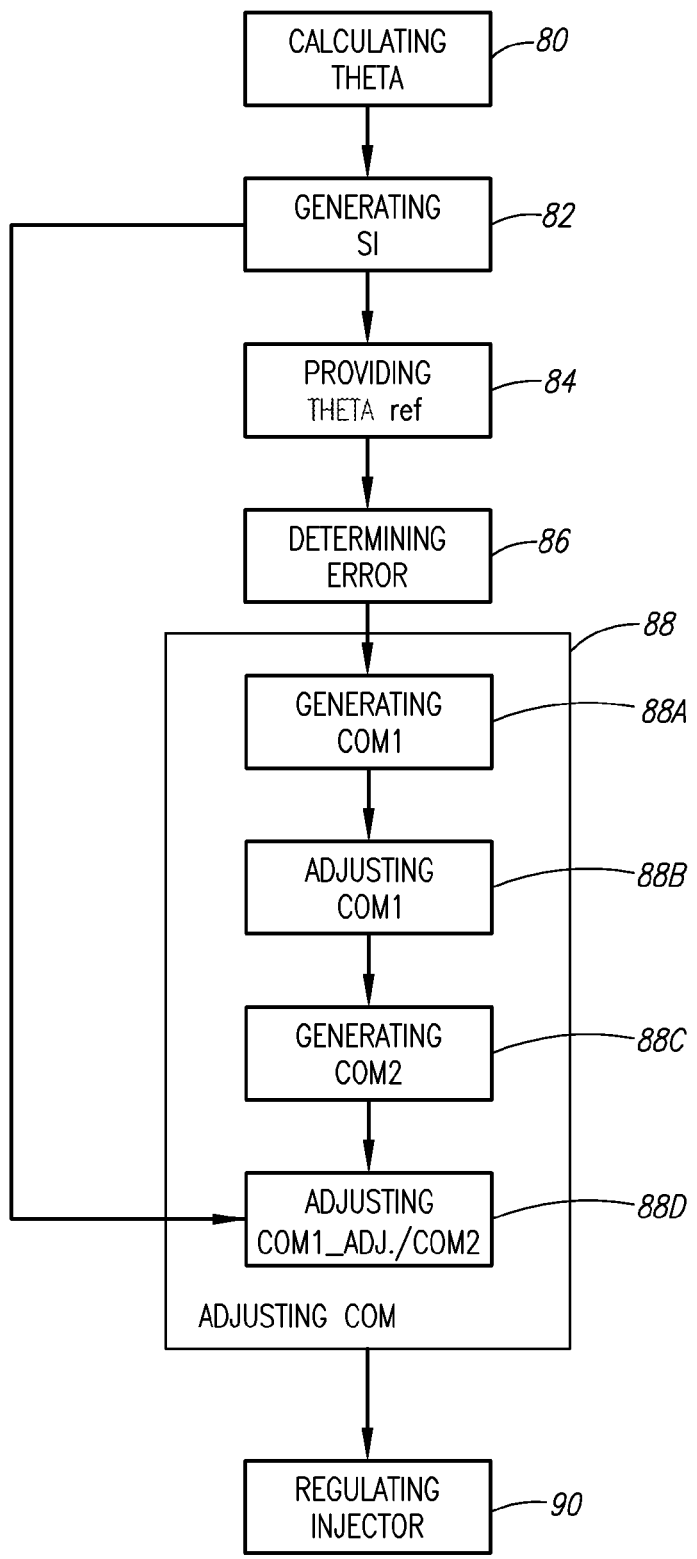
FIG. 7 is a flow chart illustrating steps of a method for controlling ammonia slip downstream of a SCR system in accordance with at least one aspect of the present invention.

Turning to FIG. 7, another illustrative method for controlling ammonia slip downstream of a SCR system 10 in accordance with aspects of the present invention will now be described.

In the illustrative embodiments, the methods may include a step 80 of calculating theta. The primary chemical reaction that occurs within the SCR reactor 16 is:

$$NO_x + NH_3 + O_2 \rightarrow N_2 + H_2O \qquad (1)$$

By imposing the changes (e.g. step-wise or linear perturbations) of NO$_x$ and ammonia concentration ($C_{NOx}$, $C_{NH3}$), temperature (T), and mass flow rate (M) at the inlet 20, the dynamics of SCR reaction (1) can be understood and mechanistic aspects of the reaction can be clarified. In particular, the adsorption-desorption behavior (e.g. theta) of the ammonia on the catalyst surface can be understood relative to gas phase behavior of the reactants.

Theta can be estimated by various SCR models having partial differential kinetic equations. The equations can be solved by ways such as standard finite difference techniques for a spatial discretization, and using the library routine LSODE (Hindmarsh's ordinary differential equations solver) for integration in time. In one illustrative embodiment, a LPM model is used to calculate theta by a lumped-parameter discretization. The estimated theta for lump 1, which is the lumped parameter representation located nearest to the inlet 20 representing about 3% of the total reactor axial length, is determined as a good advance indicator of ammonia slip 26 (SLIP).

In illustrative embodiments, methods can include generating the saturation indication (SI) based on theta at step 82. A lookup table 44 having a theta saturation schedule can be used for example. The value of the saturation indication (SI) is 0 if the theta is larger than a threshold value in the lookup table 44, while the value of the saturation indication (SI) is 1 if theta is smaller than the threshold value. For example, the threshold value is between 0.15 and 0.2. Therefore, for theta input values between 0 and 0.15, the output is 1; for theta input values between 0.15 and 0.2, the output varies linearly from 1 to 0; and for theta input values between 0.2 and 1, the output is 0.

In illustrative embodiments, methods can further include a step 84 of determining a reference value (theta$_{ref}$) of ammonia adsorbed on the catalyst surface of the SCR reactor 16, and a step 86 of determining the error between theta and theta$_{ref}$. Theta$_{ref}$ is predetermined according to various conditions such as the selected, desired values of the ammonia slip 26 (SLIP) and NO$_x$ ($C_{NOx}$) in the flue gases. In one example, theta$_{ref}$ equals to 0.1.

In illustrative embodiments, methods can include a step 88 of adjusting a command signal for regulating the operation of the injector 24 using an open-loop control scheme. In one example, step 88 can include generating a first command signal (COM1) using a feedforward control of NO$_x$ at step 88A; and adjusting the first command signal (COM1) based on the error between theta and theta$_{ref}$ to generate an adjusted first command signal (COM1_ADJ) at step 88B. Step 88 can still further include step 88C of generating a second command signal (COM2) using a feedback control of ammonia slip 26 (SLIP) and step 88D of adjusting the first and/or the second command signal based on the saturation indication (SI) to generate a command signal (COM). In another example, steps 82, 84, 86, 88A, and 88B can be omitted. In such a manner, any command signal for regulating the injector 24 can be adjusted by the saturation indication (SI) at step 88 directly.

As mentioned above, the saturation indication (SI) is between 0 and 1. Accordingly, at step 90, if the catalyst 18 in the SCR reactor 16 is saturated with the ammonia, the saturation indication is 0 and the command signal is also 0 and thus, the injector 24 will temporality be shut-down to stop injecting more ammonia into the SCR reactor 16. In such a manner, the ammonia slip 26 (SLIP) is reduced and undesired ammonia slip is prevented. When theta gradually reduces and is below the threshold value, the saturation indication is reduced. Thus, the injector 24 continues to inject the ammonia into the SCR reactor 16 as the catalyst 18 can adsorb more ammonia. No feedback is required in regulating the command signal (COM) by theta and thus, the complexity and cost of using the method is reduced. The method is particular useful for regulating the ammonia slip during transition operation such as the startup and shutdown operation of a powerplant when the temperature of the SCR reactor 16 is below the optimal temperature for the catalyst 18.

Figure 9:
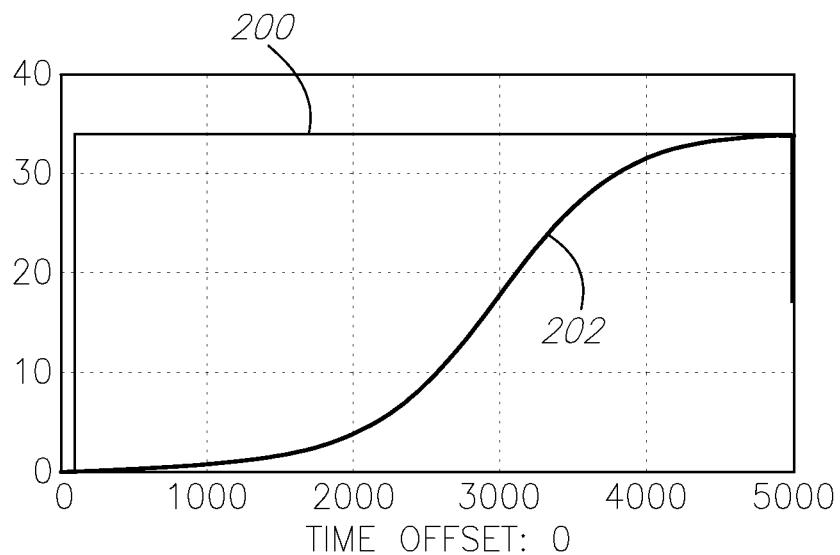
FIG. 9 shows example plots of a step change in ammonia injection and ammonia absorption at a catalyst surface rising to a point of ammonia slip, with the time between injection initiation slip occurrence being the time until the plots intersect.
Figure 10:
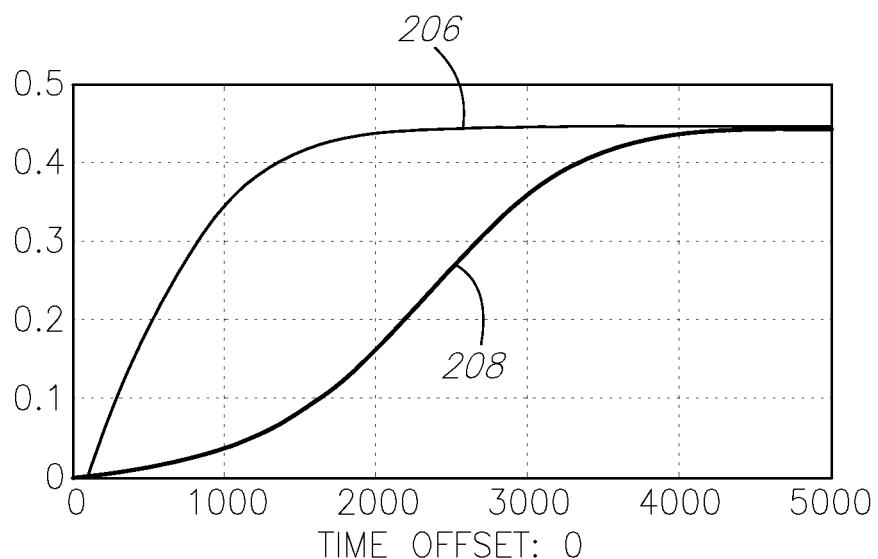
FIG. 10 shows example plots of a value theta at a first lump and a fifth lump, with the value of the fifth lump showing the same trend as the ammonia slip is provided, but with the first lump providing advance indication that ammonia slip is imminent.

Turning to FIGS. 9 and 10, time response of a five-lump kinetic model to a step change in ammonia at the inlet are shown. Specifically, FIG. 9 shows a plot that has one plot line 200 representing injected ammonia and a second plot line 202 representing ammonia slip at the exit. As seen in FIG. 9, approximately 5000 seconds elapse before the full amount of injected ammonia appears at the reactor exit as ammonia slip. From time zero to approximately 5000 seconds ammonia is adsorbed onto the catalyst surface. FIG. 10 illustrates a plot 206 of the value of theta for lump 1 near the SCR reactor inlet and a plot 208 of the value of theta for lump 5 at the reactor exit. The value of theta for lump 5 has the same trends as the ammonia slip. One can see that the value of theta for lump 1 achieves its final value of about 0.45 long before lump 5, thereby providing an advance indication that ammonia slip is imminent.

Figure 11:
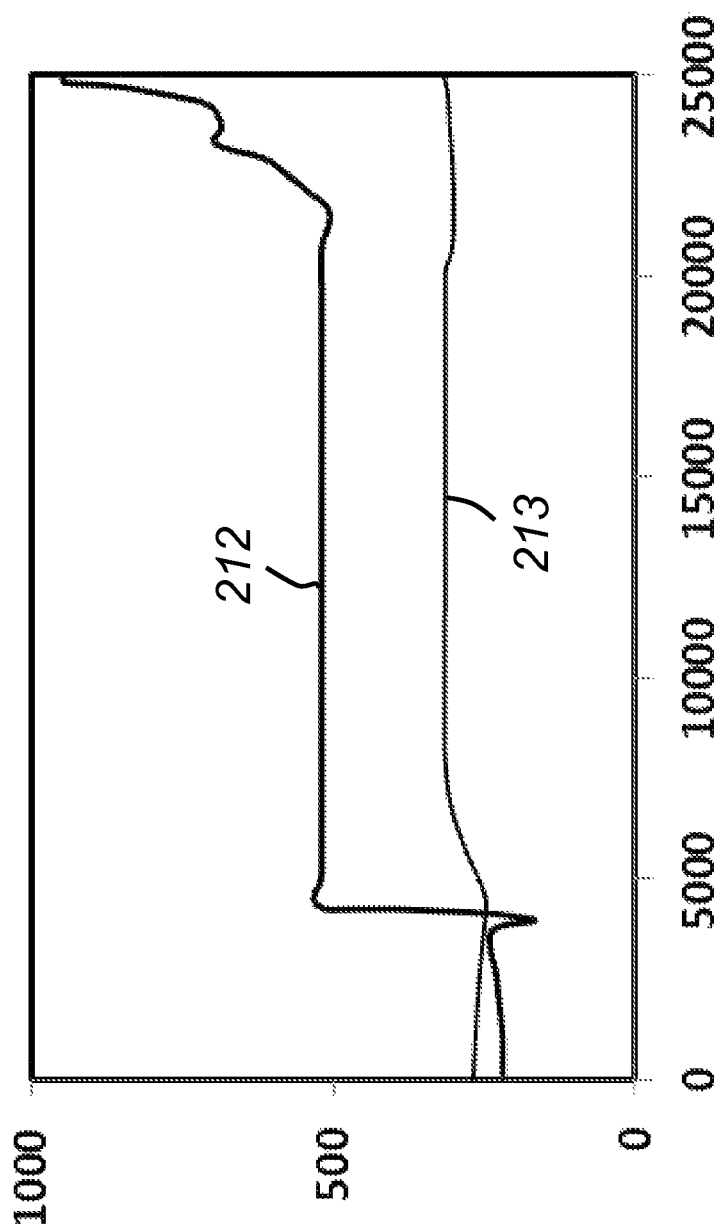
FIG. 11 shows example plots of gas flow and SCR inlet temperature over time during a power plant start-up, with an increase in flow being shown by the plot during start-up.
Figure 12:
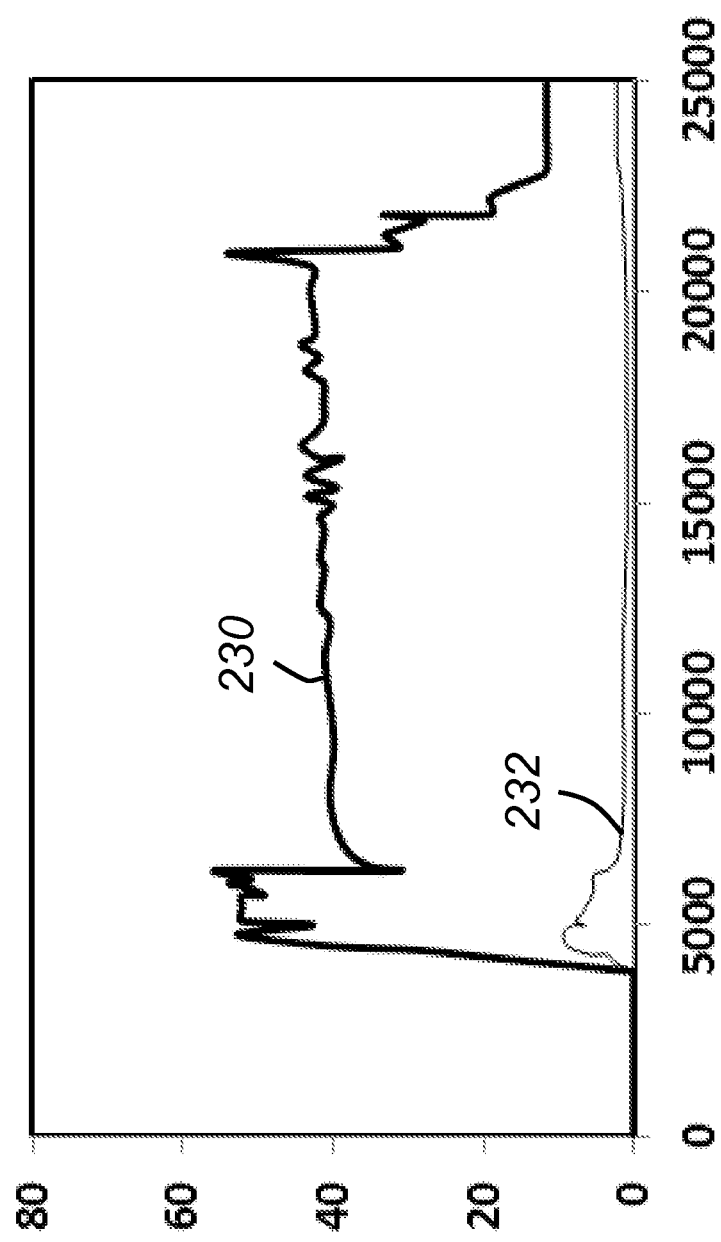
FIG. 12 shows an example plot of NOx associated with the plot of FIG. 11 using one example embodiment of the present invention.
Figure 13:
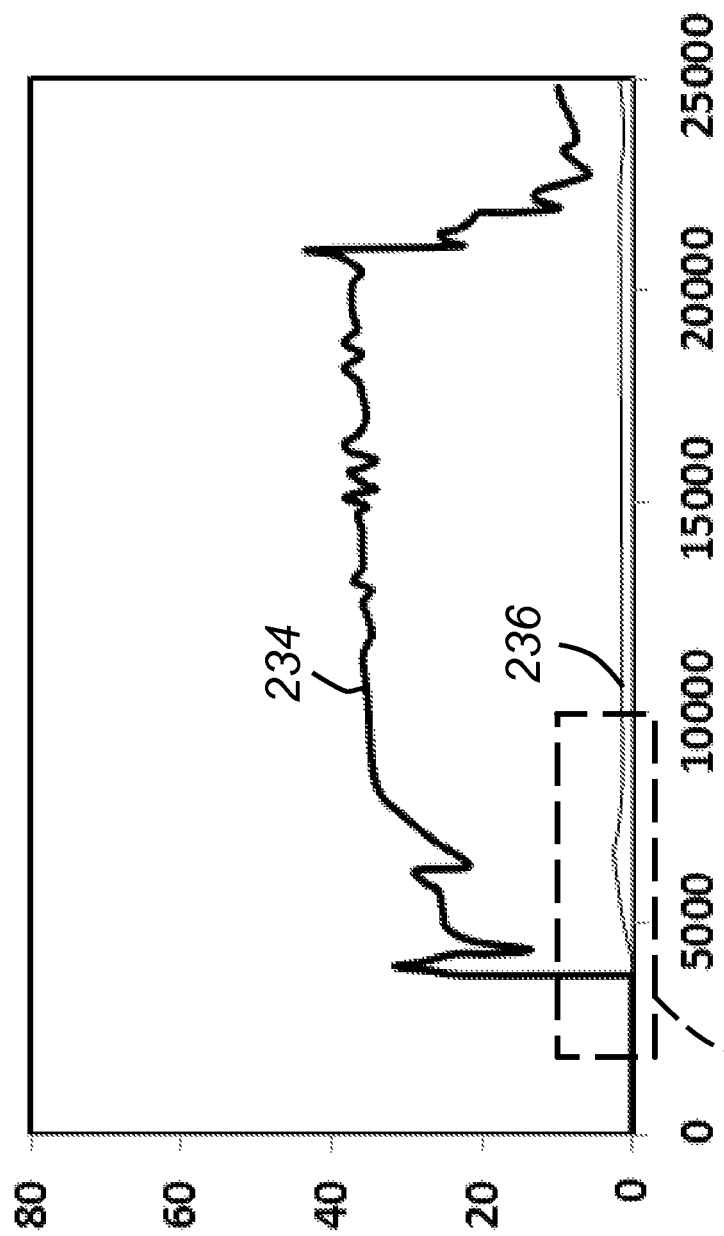
FIG. 13 shows an example plot of ammonia injected and ammonia slip associated with the plot of FIG. 11 using one the example embodiment of the present invention.
Figure 14A:
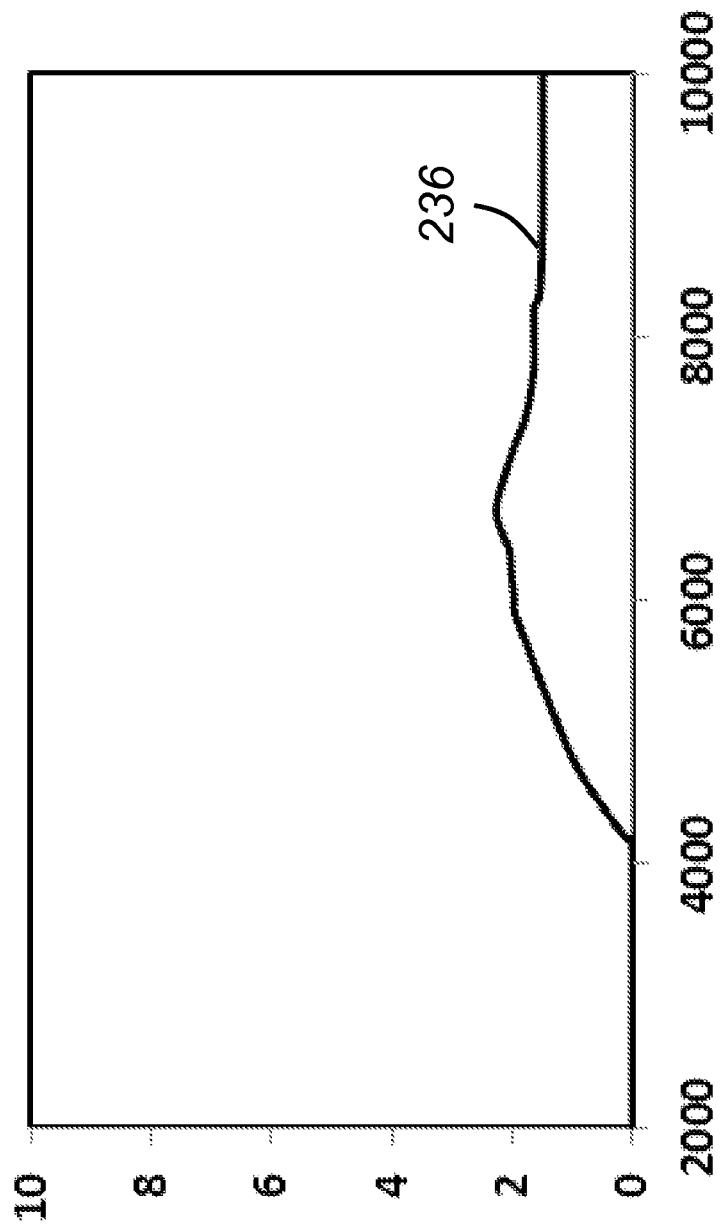
Figure 14B:
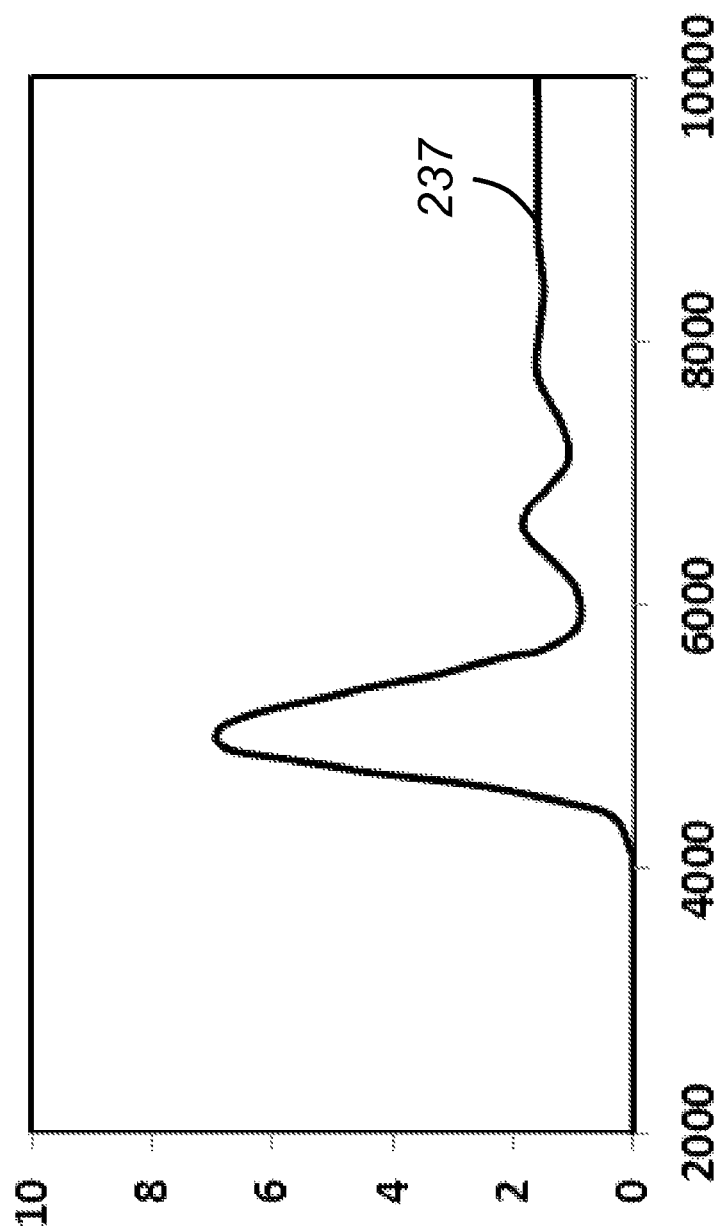
FIG. 14B shows the ammonia slip that would occur with another example embodiment of the present invention.

FIGS. 11-14 show results of a simulation wherein data representing a gas turbine power plant startup are used as inputs for a model of the full-size SCR reactor for that plant. FIG. 11 shows example plots 212 of gas flow and SCR inlet temperature 213 over time, with an increase in flow being shown by the plot throughout start-up. This particular powerplant example has a limit of 2 ppm for stack NOx and 5 ppm for ammonia slip. FIGS. 12, 13 and 14A show results for operating conditions presented in FIG. 11 with aspects in accordance with the present invention. For this simulation theta star has a value of 0.1. FIG. 12 shows plots of NOx, with plot 230 being for the inlet and plot 232 being for the outlet. FIG. 13 shows plots of ammonia, with plot 234 being for the inlet and plot 236 being for the outlet (ammonia slip). The SCR controls reduce stack NOx to below 2 ppm at elapsed time of about 7000 seconds and (with an embodiment of the invention active) also, as shown in FIG. 14A limit ammonia slip to about 2 ppm—well below the 5 ppm limit. FIG. 14B shows abbreviated simulation results similar to those for FIGS. 11-13 but using an embodiment of the invention wherein theta controller 34 is inactive. The ammonia slip 237 is more oscillatory, has excessive overshoot to about 7 ppm but does capture the selected, desired ammonia slip setpoint. Thus, one aspect of the present invention is for reducing startup NOx while also preventing excessive ammonia slip.

Figure 15:
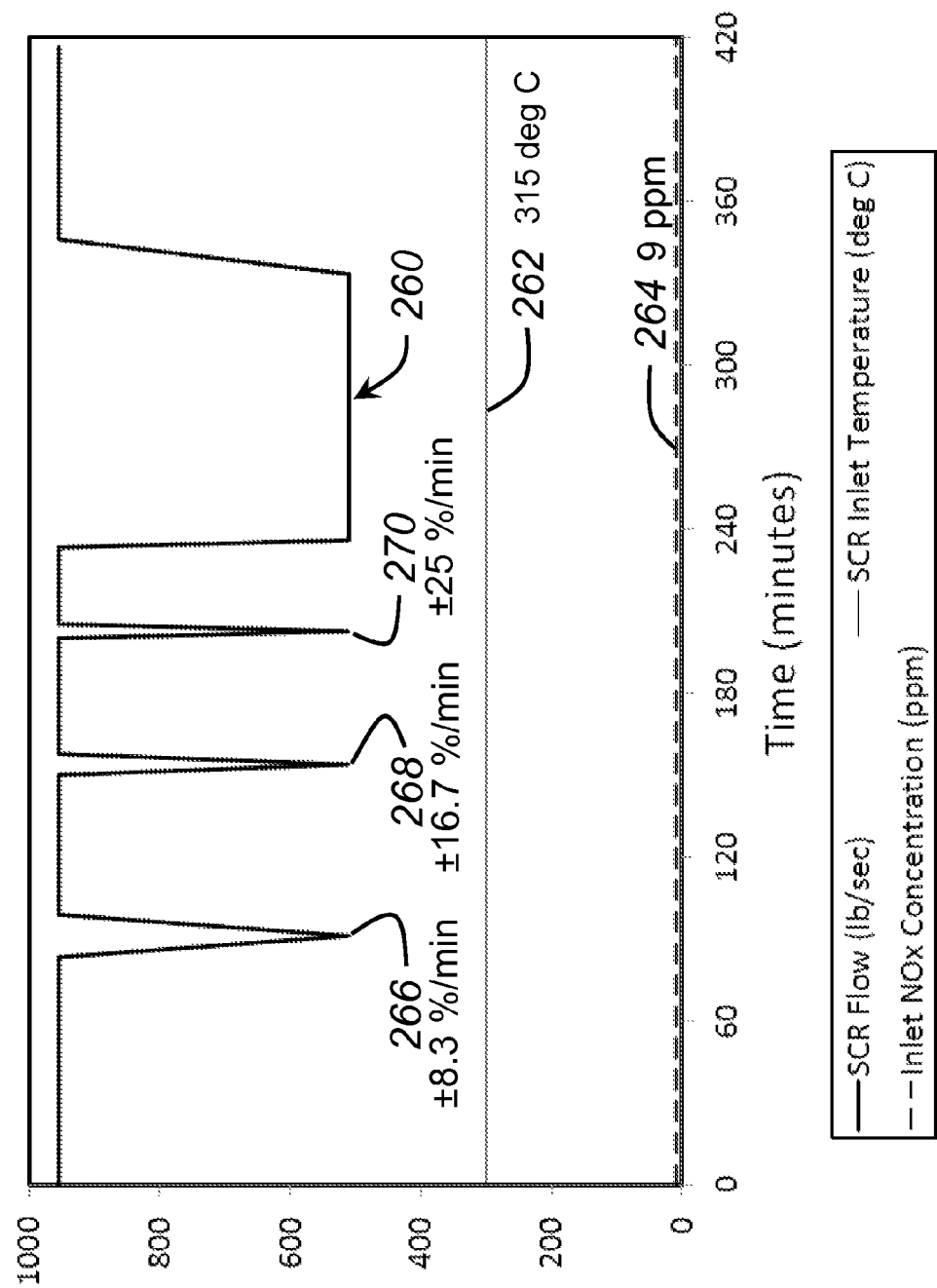
FIG. 15 shows gas flow, temperature, and inlet NOx at SCR inlet during powerplant operation wherein both steady state and transition conditions occur.
Figure 16:
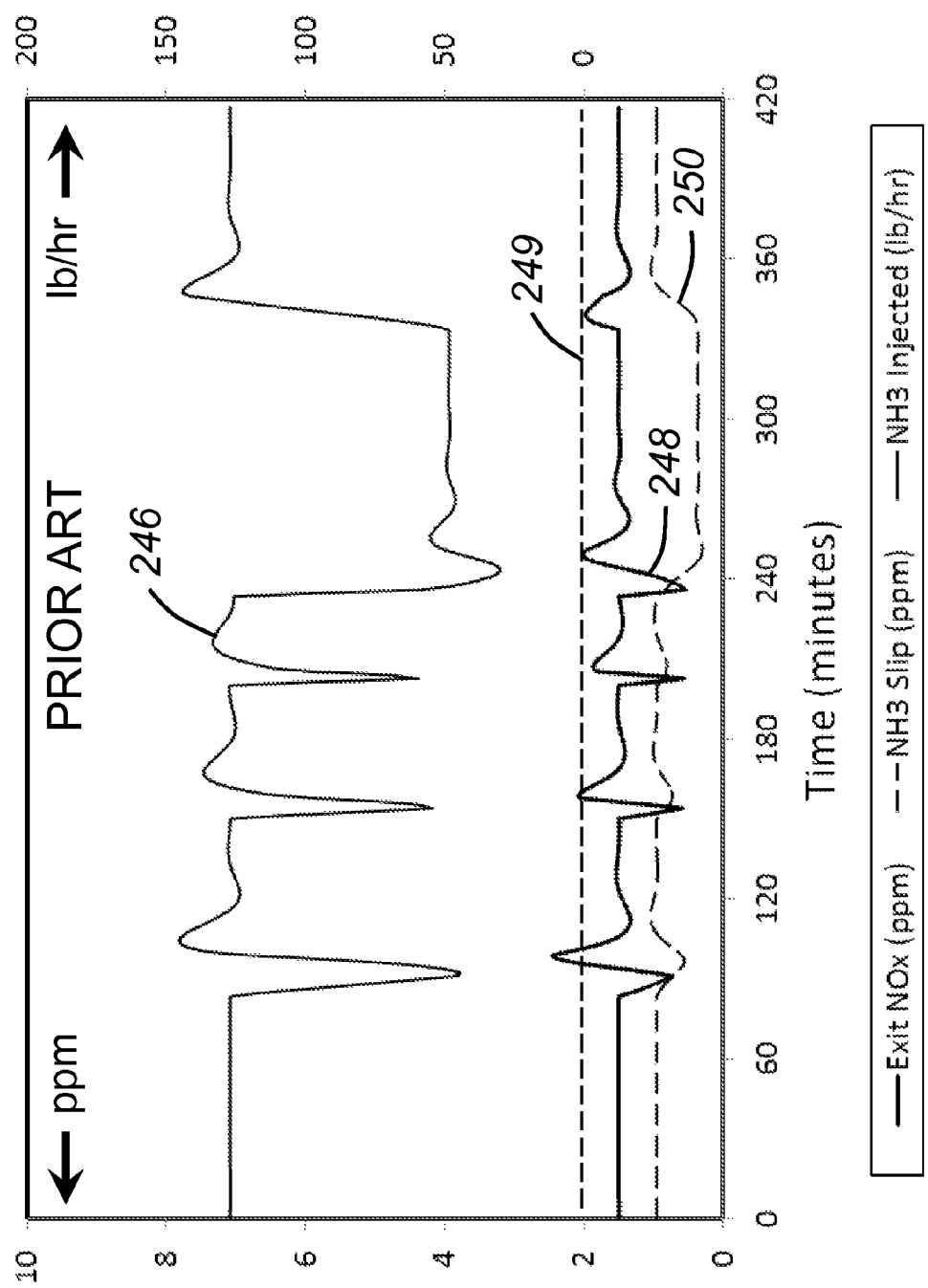
FIG. 16 shows exit NOx, ammonia slip, and injected ammonia for the powerplant operating example of FIG. 15 wherein a prior-art NOx setpoint controller is used, so illustrating what would occur in the prior-art.
Figure 17:
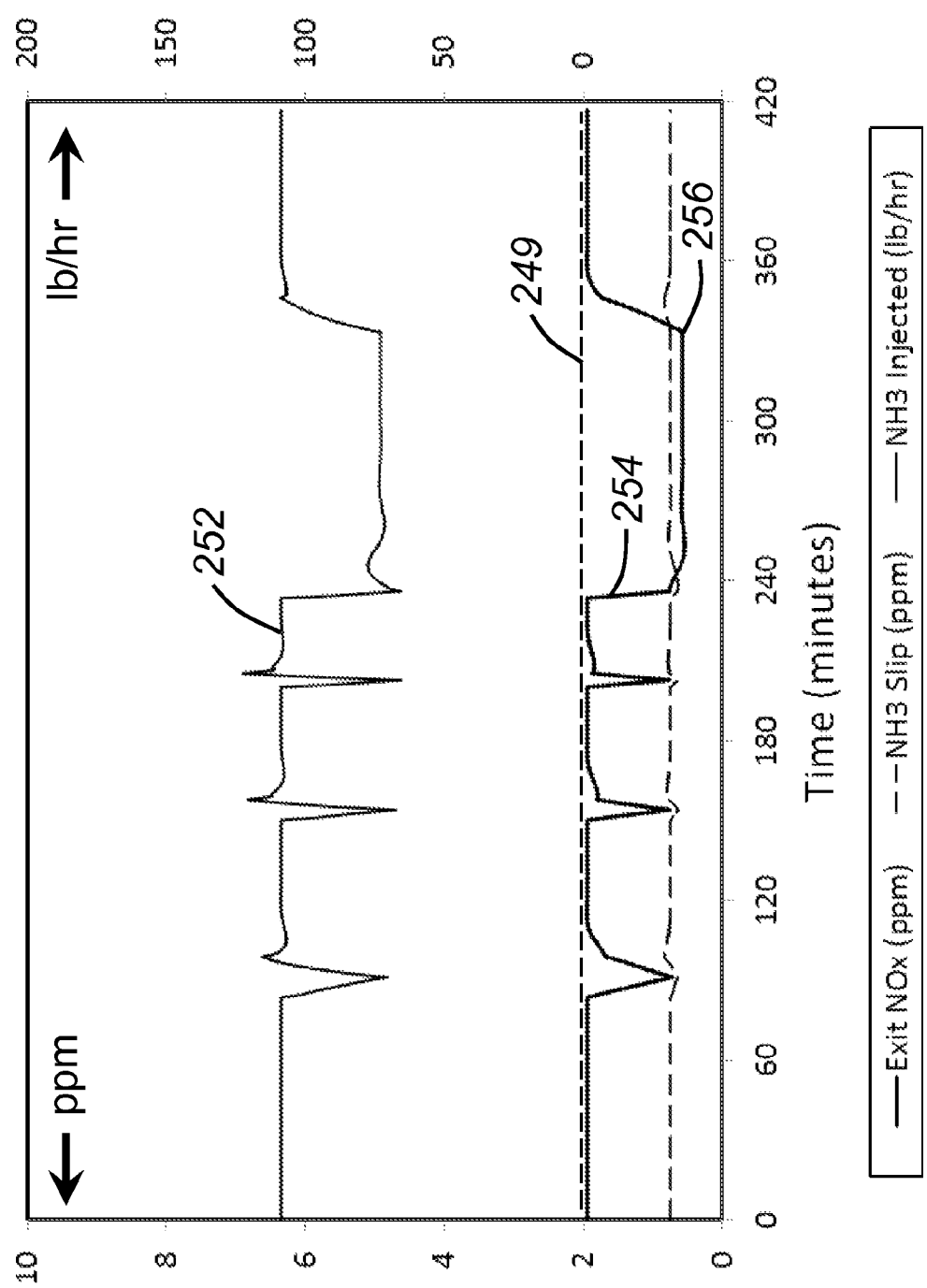
FIG. 17 shows exit NOx, ammonia slip, and injected ammonia for the powerplant operating example of FIG. 15 wherein the one example embodiment for an ammonia slip setpoint controller is used.
Figure 18:
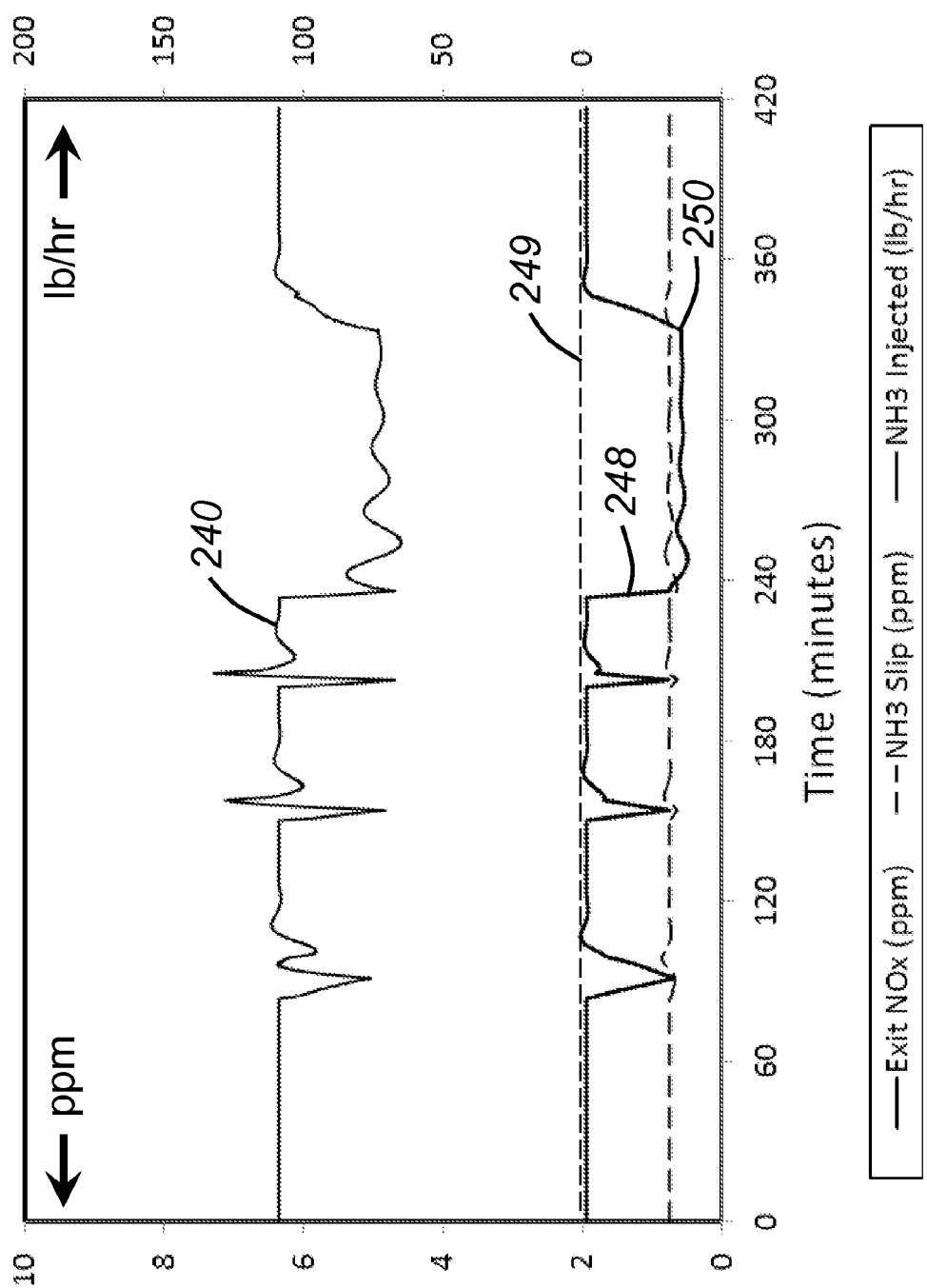
FIG. 18 shows exit NOx, ammonia slip, and injected ammonia for the powerplant operating example of FIG. 15 wherein another embodiment for an ammonia slip setpoint controller is used.

FIGS. 15-18 show results of simulations that represent high-magnitude, rapid changes in the electrical output of a power plant (e.g., "rapid ramp") with a prior-art controller and two embodiments of the present invention. FIG. 15 shows plots of gas flow 260, SCR inlet temperature 262 and inlet NOx 264. Gas flow 260 has flow excursions 266, 268 and 270 associated with minus-then-plus 8.3%, 16.7% and 25% variations per minute in the power plant electrical output. Temperature 262 is constant at 315 degrees C., and inlet NOx is constant at 9 ppm during these simulations. FIG. 16 shows simulation results wherein a prior-art NOx setpoint control is used. Plots of injected ammonia 246, exit NOx 248 and ammonia slip 250 are shown. The exit NOx setpoint is 1.5 ppm compared to NOx limit 249 at 2 ppm. The time response 248 for exit NOx shows overshoots above 2 ppm despite the setpoint being much lower at 1.5 ppm. These overshoots could potentially be eliminated by moving the NOx setpoint even lower (to 1 ppm or lower), but doing so would result in an undesired increase in ammonia injection. FIG. 17 shows simulation results wherein one example embodiment of the ammonia slip setpoint control is used, where the one example embodiment includes theta controller 34. Plots of injected ammonia 252, exit NOx 254 and ammonia slip 256 are shown. The ammonia slip setpoint is 0.75 ppm. The one example embodiment of the ammonia slip controller allows the ammonia slip setpoint to be set such that resultant exit NOx is very near the 2 ppm limit 249. The exit NOx time response provided by the controller does not have upward overshoots thereby providing confidence that the NOx limit will not be exceeded. Ammonia injected is considerably less than for prior-art controls in FIG. 16. FIG. 18 shows simulation results wherein another embodiment of the ammonia slip setpoint control is used, where theta controller 34 is inactive. Plots of injected ammonia 240, exit NOx 248 and ammonia slip 250 are shown. The ammonia slip setpoint is 0.75 ppm. The one example embodiment of the ammonia slip controller allows the ammonia slip setpoint to be set such that resultant exit NOx is near the 2 ppm limit 249. The exit NOx time response provided by the controller has small upward overshoots above the NOx limit. It can be seen by comparing FIG. 18 with FIG. 17 that theta controller 34 provides increased damping thereby providing a more desirable time response. Thus another aspect of the invention is to prevent exit NOx from exceeding the NOx limit during transition operation, including a reduction in the amount of ammonia injected.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method of controlling a selective catalyst reduction (SCR) system having a SCR reactor to control an amount of a NOx composition in a flow of a gas exiting the SCR reactor to be below a selected limit, the method including:

receiving a reductant slip set point input as a control variable for maintaining the amount of the $NO_x$ composition included in a flow of combustion gas below the selected limit, wherein the reductant slip set point is indicative of a target reductant slip that is desired downstream of the SCR reactor;

receiving an operational parameter signal transmitted by a sensor indicative of an operation parameter of the SCR reactor;

receiving a reductant slip signal transmitted by a sensor, the reductant slip signal being indicative of a reductant slip downstream of the SCR reactor;

determining an amount of a $NO_x$ reductant to be introduced to the SCR reactor based at least in part on a relationship between the target reductant slip and the reductant slip downstream of the SCR reactor indicated by the reductant slip signal, the step of determining an amount of a NOx reductant to be introduced including:
 determining whether the operational parameter indicates that the SCR reactor is operating in a steady state mode or in a transition mode;
 during a period while the SCR reactor is operating in the steady state mode:
  determining the amount of the NOx reductant to be introduced by according of a relatively lower priority weighting on the difference between the target reductant slip and the reductant slip downstream of the SCR reactor; and
 during a period while the SCR reactor is operating in the transition mode:
  determining the amount of the NOx reductant to be introduced by according of a relatively higher priority weighting on the difference between the target reductant slip and the reductant slip downstream of the SCR reactor;

transmitting a control signal to cause introduction of the determined amount of the $NO_x$ reductant to the SCR reactor to maintain the amount of the NOx composition in the flow of combustion gas below the selected limit; and introducing the amount of the NOx reductant to the SCR reactor in accordance with the control signal.

2. The method of claim 1 further including:
determining that an excess slip condition exists, where the reductant slip downstream of the SCR reactor exceeds the target reductant slip; and
in response to said determining that the excess slip condition exists, transmitting a reduction signal to reduce the amount of the $NO_x$ reductant introduced to the SCR reactor from a first amount resulting in the determination that the excess slip condition exists to a second amount that is less than the first amount.

3. The method of claim 1, wherein the $NO_x$ reductant includes one or more of a group consisting of anhydrous ammonia, aqueous ammonia and urea.

4. The method of claim 1 further including:
in response to a determination that a low slip condition exists, where the reductant slip downstream of the SCR reactor is less than the target reductant slip by a predetermined extent, transmitting another control signal to increase the amount of the $NO_x$ reductant being introduced to the SCR reactor from a third amount resulting in the determination that the low slip condition exists to a fourth amount that is greater than the third amount.

5. The method of claim 1, wherein said determining the amount of the NOx reductant to be introduced to the SCR reactor is based primarily on the difference between the target reductant slip and the reductant slip downstream of the SCR reactor for a transition period within the transition mode during which an operational parameter of the SCR reactor changes by at least 5% per minute.

6. The method of claim 5, wherein the operational parameter is a mass flow rate of the flow of combustion gas.

7. The method of claim 5, wherein the operational parameter of the SCR reactor changes by at least 10% per minute during the transition period.

8. A method of regulating emission of a $NO_x$ composition with a selective catalyst reduction (SCR) system including a SCR reactor to control an amount of the NOx composition in a flow of a gas exiting the SCR reactor to be below a selected limit, the method including:
 with the SCR reactor, receiving a flue gas emitted by a combustion source;
 introducing a $NO_x$ reductant to the flue gas upstream of a catalyst provided to the SCR reactor;
 establishing a target reductant slip suitable to maintain emission of the $NO_x$ composition in an flow of combustion gas exiting the SCR reactor below the selected limit, wherein the target reductant slip corresponds to a desired amount of the $NO_x$ reductant introduced to the SCR reactor that is to exit the SCR reactor with the flow of combustion gas;
 monitoring an operational parameter of the SCR reactor;
 monitoring a reductant slip of the SCR reactor by sensing a parameter indicative of the amount of the $NO_x$ reductant exiting the SCR reactor;
 determining whether the operational parameter indicates that the SCR reactor is operating in a steady state mode or in a transition mode; and
 maintaining the $NO_x$ composition in the flow of combustion gas below the selected limit based at least in part on a result of said monitoring the reductant slip by controlling introduction of the $NO_x$ reductant introduced to the SCR reactor to cause the reductant slip of the SCR reactor to approach the target reductant slip, including when the SCR reactor is operating in the steady state mode determining the amount of the NOx reductant to be introduced by according of a relatively lower priority weighting on the difference between the target reductant slip and the reductant slip downstream of the SCR reactor, and when the SCR reactor is operating in the transition mode determining the amount of the NOx reductant to be introduced by according of a relatively higher priority weighting on the difference between the target reductant slip and the reductant slip downstream of the SCR reactor.

9. The method of claim 8, wherein said maintaining the $NO_x$ composition below the predetermined limit based at least in part on the result of said monitoring the reductant slip is performed during a transition period when the rate of change of the operational parameter is at least 5% per minute.

10. The method of claim 9, wherein the rate of change of the operational parameter during the transition period is at least 10% per minute.

11. The method of claim 9, wherein the operational parameter is a mass flow rate of the flow of combustion gas.

12. The method of claim 9, wherein
the target reductant slip is a primary control variable relative to the selected limit for said controlling the introduction of the $NO_x$ reductant to the SCR reactor during the transition period, and
the selected limit is a control variable relative to the target reductant slip for said controlling the introduction of the $NO_x$ reductant to the SCR reactor at the time outside of the transition period.

13. A method of controlling a selective catalyst reduction (SCR) system having a SCR reactor to control an amount of a NOx composition in a flow of a gas exiting the SCR reactor to be below a selected limit, the method including:

receiving a reductant slip set point indicative of a target reductant slip;

receiving the selected limit indicating a maximum amount of the $NO_x$ composition deemed to be allowable in a flow of combustion gas exiting the SCR reactor;

sensing and receiving information indicative of an amount of the reductant slip in the flow of combustion gas downstream of the SCR reactor;

sensing and receiving information indicative of an amount of the $NO_x$ composition in the flow of combustion gas downstream of the SCR reactor;

monitoring an operational parameter of the SCR reactor to determine whether the SCR reactor is operating in a steady state mode or a transition mode;

introducing a reductant into the SCR reactor;

in response to a determination that the SCR reactor is operating in the steady state mode, controlling the introduction of the reductant into the SCR reactor based at least by according of a relatively higher priority weighting on a relationship between the sensed and received information indicative of the amount of $NO_x$ composition in the flow of combustion gas and the maximum amount of the $NO_x$ composition and by according of a relatively lower priority weighting on a relationship between the sensed and received information indicative of the amount of reductant slip downstream of the SCR reactor and the target reductant slip; and in response to a determination that the SCR reactor is operating in the transition mode, controlling the introduction of the reductant into the SCR reactor based at least by according of a relatively higher priority weighting on a relationship between the sensed and received information indicative of the amount of reductant slip downstream of the SCR reactor and the target reductant slip and by according of a relatively lower priority weighting on a relationship between the sensed and received information indicative of the amount of $NO_x$ composition in the flow of combustion gas and the maximum amount of the $NO_x$ composition.

14. The method of claim 13, wherein the SCR reactor is determined to be operating in said transition mode when the operational parameter of the SCR reactor changes by at least 5% per minute.

15. The method of claim 13, wherein the operational state of the SCR reactor is a mass flow rate of the flow of combustion gas.

16. The method of claim 13, wherein the target reductant slip is a primary control variable relative to the selected limit for said controlling the introduction of the $NO_x$ reductant to the SCR reactor while the SCR reactor is operating in the transition mode, and the selected limit is a control variable relative to the target reductant slip for said controlling the introduction of the $NO_x$ reductant to the SCR reactor while the SCR reactor is operating in the steady state mode.

17. A selective catalyst reduction (SCR) system including:

a SCR reactor including an inlet through which a flue gas emitted by a combustion source is introduced to the SCR reactor and an outlet through which a flow of combustion gas exits the SCR reactor;

a catalyst provided to the SCR reactor;

an injector configured to introduce a reductant into the SCR reactor;

a reductant slip sensor that senses a quantity indicative of the reductant slip downstream of the SCR reactor and transmits a signal representing the reductant slip;

an operation parameter sensor that senses an operation parameter of the SCR reactor and transmits a signal indicative of the operational parameter; and a controller that regulates introduction of the reductant into the SCR reactor through the injector and controls emission of a $NO_x$ composition in the flow of combustion gas based at least in part on a target reductant slip;

wherein the controller includes:

a receiving component that receives a reductant slip set point indicative of the target reductant slip, a sensing component that receives the signals transmitted by the reductant slip sensor and the operation parameter sensor, a calculation component that establishes an amount of the reductant to be introduced into the SCR reactor based at least in part on the reductant slip downstream of the SCR reactor relative to the target reductant slip, wherein the calculation component including a portion for determining whether the operational parameter indicates that the SCR reactor is operating in a steady state mode or in a transition mode, and a portion for determining the amount of a NOx reductant to be introduced by according of a relatively lower priority weighting on the difference between the target reductant slip and the reductant slip downstream of the SCR reactor during a period while the SCR reactor is operating in the steady state mode and by according of a relatively higher priority weighting on the difference between the target reductant slip and the reductant slip downstream of the SCR reactor during a period while the SCR reactor is operating in the transition mode, and a transmission component that transmits a control signal for controlling operation of the injector to regulate an amount of the reductant being introduced to the SCR reactor as a dosing to cause the reductant slip of the SCR reactor to approach the target reductant slip.

18. The SCR system of claim 17, wherein the calculation component determines whether the SCR reactor is operating in a transition mode where the operational parameter is changing by at least 5% per minute, or a steady state mode where the operational parameter is substantially constant or changing by less than 5% per minute.

19. The SCR system of claim 18, wherein the calculation component establishes the amount of the reductant to be introduced into the SCR reactor based at least in part on the reductant slip sensed downstream of the SCR reactor in comparison to the target reductant slip while the SCR reactor is operating in the transition mode.

* * * * *